(12) United States Patent
Iyer (10) Patent No.: US 8,444,737 B2
(45) Date of Patent: May 21, 2013

(54) CERAMIC STRUCTURES AND METHODS OF MAKING CERAMIC STRUCTURES

(75) Inventor: Sriram Rangarajan Iyer, Painted Post, NY (US)

(73) Assignee: Corning Incorporated, Corning, NY (US)

(*) Notice: Subject to any disclaimer, the term of this patent is extended or adjusted under 35 U.S.C. 154(b) by 310 days.

(21) Appl. No.: 12/394,874

(22) Filed: Feb. 27, 2009

(65) Prior Publication Data

US 2010/0218472 A1 Sep. 2, 2010

(51) Int. Cl.
*B01D 39/14* (2006.01)
*B01D 39/06* (2006.01)
*B01D 50/00* (2006.01)
*F01N 3/00* (2006.01)

(52) U.S. Cl.
USPC .......... 55/523; 55/522; 55/524; 422/169; 422/170; 422/171; 422/172; 422/177; 422/178; 422/179; 422/180; 422/181; 422/182; 60/297

(58) Field of Classification Search
USPC ...... 55/522–524; 422/169–172, 177–182; 60/297
See application file for complete search history.

(56) References Cited

U.S. PATENT DOCUMENTS

| | | | |
|---|---|---|---|
| 5,725,829 A | 3/1998 | Miyahara et al. | |
| 5,868,977 A | 2/1999 | Ito et al. | |
| 6,004,501 A | 12/1999 | Cornelius et al. | |
| 6,004,502 A | 12/1999 | Ito et al. | |
| 6,027,684 A | 2/2000 | Gheorghiu et al. | 264/631 |
| 6,048,490 A | 4/2000 | Cornelius et al. | |
| 6,099,793 A | 8/2000 | Dull et al. | |
| 6,210,626 B1 | 4/2001 | Cornelius et al. | |
| 6,287,509 B1 | 9/2001 | Gheorghiu | |
| 6,287,510 B1 | 9/2001 | Xun | |
| 6,344,634 B2 | 2/2002 | Brennan | |
| 6,344,635 B2 | 2/2002 | Brennan | |
| 6,511,628 B2 | 1/2003 | Gheorghiu et al. | |
| 7,238,319 B2* | 7/2007 | Brennan et al. | 264/648 |
| 7,358,210 B2* | 4/2008 | Tanaka et al. | 502/251 |
| 7,364,689 B2 | 4/2008 | Noguchi et al. | |
| 7,635,446 B2* | 12/2009 | Henley et al. | 264/630 |
| 2002/0003322 A1 | 1/2002 | Dull et al. | |
| 2003/0093982 A1* | 5/2003 | Suwabe et al. | 55/523 |
| 2003/0143370 A1 | 7/2003 | Noguchi et al. | 428/116 |
| 2003/0151155 A1 | 8/2003 | Muroi et al. | 264/44 |
| 2005/0046063 A1 | 3/2005 | Toda et al. | |
| 2005/0242455 A1 | 11/2005 | Toda et al. | |
| 2005/0253311 A1 | 11/2005 | Nakamura et al. | |
| 2006/0185335 A1* | 8/2006 | Ichikawa | 55/523 |
| 2006/0244165 A1* | 11/2006 | Huang | 264/29.5 |

FOREIGN PATENT DOCUMENTS

| | | |
|---|---|---|
| EP | 0 335 735 | 10/1989 |
| EP | 1 591 428 | 11/2005 |
| JP | 2002-160976 | 6/2004 |

* cited by examiner

*Primary Examiner* — Amber Orlando
(74) *Attorney, Agent, or Firm* — Matthew B. McNutt (57) ABSTRACT

A method of firing a green structure to produce a ceramic structure may comprise heating a firing environment during a first stage of firing of a green structure over a first timed temperature cycle having an average ramp rate sufficient to substantially complete burnout of organic material prior to initiation of clay dehydration proximate a core of the ceramic structure. The method may further comprise heating the firing environment during a second stage of the firing over a second timed temperature cycle having an average ramp rate that is faster than the average ramp rate of the first timed temperature cycle.

12 Claims, 9 Drawing Sheets

CERAMIC STRUCTURES AND METHODS OF MAKING CERAMIC STRUCTURES

TECHNICAL FIELD

The present teachings relate to ceramic structures and methods of firing a green structure to produce a ceramic structure.

BACKGROUND

Environmental concerns have motivated the implementation of emission requirements for internal combustion engines and other systems throughout much of the world. Porous ceramic structures, such as, for example, cordierite ceramic structures, are often used in combustion and other systems to filter and remove particulates from fluids, such as, for example, soot and ash from exhaust gas. Such structures are generally prepared using a mixture of raw materials, which include, for example, for cordierite structures, base ceramic materials capable of forming cordierite upon firing (e.g., clay and talc), a binder (e.g., an organic cellulose ether, such as, for example, water-soluble methyl cellulose (methocel) or hydroxypropyl methyl cellulose), and a pore-forming agent (e.g., a starch). The mixture of raw materials is formed into a green structure, which is typically extruded to form a network of channels or cells (sometimes referred to as a honeycomb) configured to flow gas therethrough. The green structure is then fired to form the final ceramic product, such as, for example, cordierite particulate filters.

Such particulate filters may include, but are not limited to, diesel particulate filters that are sometimes classified by their size and the type of vehicle and/or use for which the filters will be utilized. For example, light-duty diesel (LDD) filters are typically 7 inches or less in diameter and are generally used in vehicles with unpredictable engine duty cycles (e.g., hard-duty cycles), such as, for example, passenger cars and light trucks. Heavy-duty (HDD) filters are typically 9 inches or greater in diameter and are generally used in vehicles with predictable engine duty cycles, such as, for example, large, heavy trucks (e.g., semis and/or other commercial hauling trucks).

To gain increased efficiency in making ceramic structures, such as, for example, LDD, HDD, and other types of particulate filters and/or cellular ceramic structures, it is desirable to shorten the time involved with firing the green structure to produce the final ceramic structure. However, in some cases, increasing the temperatures during the firing cycle too quickly leads to undesirable cracks in the final ceramic structure, such as, for example, in the internal portions of the structure. The problem of product survivability (e.g., elimination of cracking) has thus conventionally been dealt with by slowing down the firing cycle. In other words, the firing temperature may be increased to a peak temperature over a relatively large time period so as to avoid heating the green structure too rapidly leading to cracking.

Other methods that have been used to eliminate and/or minimize cracking include firing in a low oxygen environment, altering the raw material composition of the green structure, and/or utilizing firing additives, among others. Such techniques, however, may be product specific, thereby requiring a significant amount of trial and error before yielding desirable results. Some techniques also may be relatively expensive due to the use of relatively expensive materials and/or gas content during firing.

It may be desirable, therefore, to provide a method of firing a green structure to produce a ceramic structure that minimizes the length of the firing cycle, while reducing and/or eliminating cracking, thereby providing increased survivability for a broad range of product types, including, for example, relatively large cellular ceramic structures such as, for example, HDDs. It also may be desirable to provide a method of firing a porous ceramic structure that provides increased product survivability without requiring the addition of expensive gases and/or other firing additives.

SUMMARY

The present teachings may solve one or more of the above-mentioned problems and/or may demonstrate one or more of the above-mentioned desirable features. Other features and/or advantages may become apparent from the description that follows.

In accordance with various exemplary embodiments, the present teachings provide a method of firing a green structure to produce a ceramic structure. The method may comprise heating a firing environment during a first stage of firing of a green structure over a first timed temperature cycle having an average ramp rate sufficient to substantially complete burnout of organic material prior to initiation of clay dehydration proximate a core of the ceramic structure. The method may further comprise heating the firing environment during a second stage of the firing over a second timed temperature cycle having an average ramp rate that is faster than the average ramp rate of the first timed temperature cycle.

In accordance with various additional exemplary embodiments, the present teachings provide a porous ceramic structure made by a process comprising forming raw materials comprising clay material and organic material into a green structure and firing the green structure in a firing environment, wherein the firing comprises heating a firing environment up to and including a first threshold temperature over a first time period sufficient to substantially complete burnout of the organic material prior to initiation of dehydration of the clay material proximate a core of the green structure, and heating the firing environment from the first threshold temperature to a second threshold temperature higher than the first threshold temperature over a second time period during which clay dehydration occurs. An average ramp rate from the first threshold temperature to the second threshold temperature may range from about 11° C./hr to about 75° C./hr.

In accordance with various further exemplary embodiments, the present teachings provide a method of firing a green structure to form a ceramic structure. The method may comprise heating a firing environment to a first threshold temperature over a first time period sufficient to substantially complete burnout of organic material proximate a core of a green structure prior to initiation of dehydration of clay material proximate the core region of the green structure. The method may further comprise heating the firing environment from the first threshold temperature to a second threshold temperature higher than the first threshold temperature over a second time period during which clay dehydration of the green structure occurs, wherein an average ramp rate from the first threshold temperature to the second threshold temperature ranges from about 11° C./hr to about 75° C./hr.

Additional objects and advantages will be set forth in part in the description which follows, and in part will be obvious from the description, or may be learned by practice of the present teachings. The objects and advantages may be realized and attained by means of the elements and combinations particularly pointed out in the appended claims.

It is to be understood that both the foregoing general description and the following detailed description are exemplary and explanatory only and are not restrictive of the claims.

BRIEF DESCRIPTION OF THE DRAWINGS

The present teachings can be understood from the following detailed description either alone or together with the accompanying drawings. The drawings are included to provide a further understanding, and are incorporated in and constitute a part of this specification. The drawings illustrate one or more exemplary embodiments of the present teachings and together with the description serve to explain various principles and operation.

DESCRIPTION OF EXEMPLARY EMBODIMENTS

Figure 1:
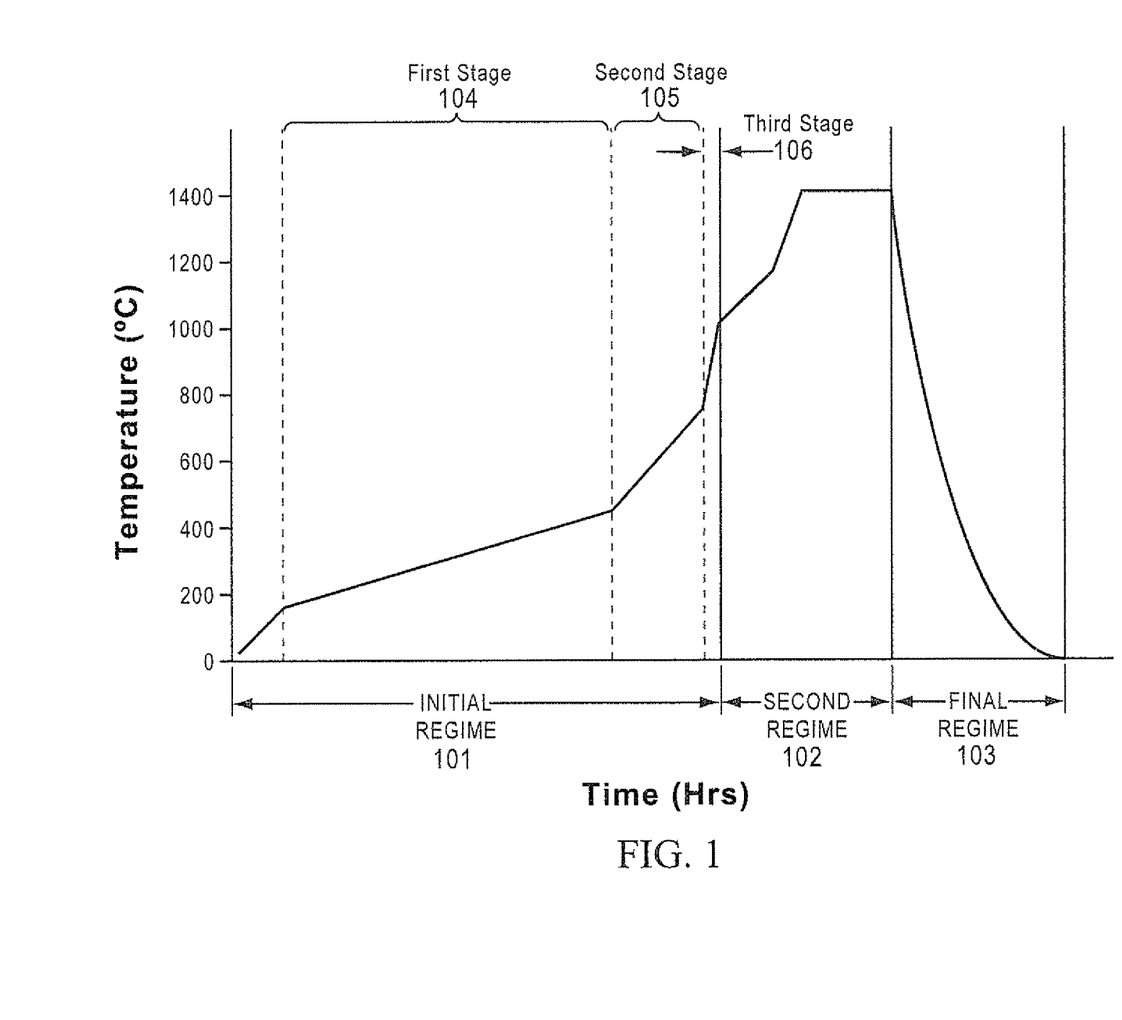
FIG. 1 is a graph illustrating an exemplary firing cycle in accordance with the present teachings.

As illustrated by FIG. 1, when forming a ceramic structure out of clay-based raw materials, such as, for example, when forming a cordierite cellular ceramic structure, there are three general regimes that occur. The first two regimes include firing of the green structure, for example, in a gas-fired kiln, and the last includes cooling the formed ceramic structure. While not wishing to be bound by any particular theory, it is believed that during an initial regime 101 (e.g., a firing environment temperature up to about 1000° C.), the raw materials of the green structure are heated and individually undergo transformations, as will be explained in further detail below. After this initial regime, in a second regime 102, the temperature of the firing environment is heated to a peak temperature, where it is held substantially constant over a time period permitting the green structure to react and form the ceramic structure. Again, while not wishing to be bound by any particular theory, it is believed that during this second regime 102 (e.g., a firing environment temperature greater than or equal to about 1000° C. and up to a peak temperature), the materials of the green structure begin to react with each other to form the ultimate ceramic material, such as, for example, cordierite. In a final regime 103, the formed ceramic structure is permitted to cool down from the peak firing temperature.

As mentioned above, in the initial regime 101, the individual materials are believed to undergo various transformations. For example, during the initial firing regime 101, various hydrous materials (e.g., hydrous alumina, hydrous clay, and talc) lose water and various organic materials (e.g., binder materials and/or pore forming agents (i.e., starch)) burnout. More specifically, within the initial firing regime 101, after an initial startup phase during which the materials of the green structure are equilibrated with the firing environment, there are three general stages of changes that the various materials of the green structure undergo. Using cordierite as an example, in a first stage 104, for example, during which the firing environment temperature increases from about 180° C. to about 425° C., hydrous alumina loses water, methocel (or other binder material) burns out and starch (or other organic pore-forming agents) burnout. In a second stage 105, for example, during which the firing environment temperature increases from about 425° C. to about 750° C., hydrous clay loses water. In a third stage 106, for example, during which the firing environment temperature increases from about 750° C. to about 1000° C., talc loses water.

Again, not wishing to be bound by any particular theory, the inventor believes the following events occur during the initial firing regime 101 described above. During the initial regime 101, decomposition of the pore-forming agent occurs. This decomposition is an oxidation or exothermic reaction that releases large amounts of heat. Initially, the exothermic reaction occurs at the skin or outer portion of the ceramic structure, resulting in an initial thermal differential whereby the outer portion of the ceramic structure is hotter than the core. Subsequently, the exothermic reaction in the skin or outer portion subsides, and the exothermic reaction region moves into the interior and toward the core of the structure.

Because ceramic (e.g., cordierite) is a good insulator, and the cellular structure that may be used for such filters comprises numerous channels, difficulties can be encountered in effectively removing, either by conduction or convection, the heat from the structure during firing. The cellular structure additionally provides a large surface area to promote binder reaction with oxygen ($O_2$) in the firing environment, thereby enhancing the interior exothermic effect. Consequently, during the organic material burnout (BO) stage (the first stage 104 described above), the structure can exhibit either a positive or a negative thermal differential (i.e., the core can exhibit either a higher or lower temperature than a location at or near the outer surface). This temperature differential can create thermal stresses in the porous ceramic structure, which may result in cracking. This phenomenon may be particularly true for large cellular ceramic structures or structures containing large amounts of organic materials, such as, for example, cordierite particulate filter products.

Due to thick wall sections (i.e., a higher organic content) and the presence of pore-forming agents (i.e., starch), ceramic structures, such as, for example, cordierite particulate filters, can exhibit relatively high exothermic heat generation and relatively large core/skin temperature gradients during the firing process. Increasing the firing ramp rate (the rate of increasing the temperature in the firing environment), without allowing for proper conduction or convection of this heat from the structure's core, can create thermal stresses, which may ultimately result in internal cracking of the structure as the structure's core shrinks away from the structure's skin. Consequently, as mentioned above, to enhance product survivability, firing cycles for such structures have traditionally been relatively long by slowly increasing the temperature in the firing environment to a peak firing temperature over a relatively long time period. By discovering various mechanisms behind why internal cracking is caused when firing ramp rates are increased, various exemplary embodiments of the present teachings include methods of firing a green structure to produce a ceramic structure that avoid such mechanisms.

The inventor has discovered that when a firing environment is heated up too quickly (e.g., over a shorter timed temperature cycle or increased ramp rate), there generally may not be enough oxygen ($O_2$) present in the environment to allow for timely burnout of the organic material (i.e., binder (e.g., methocel) and pore forming agents (e.g., starch)) in the core of the green structure prior to the next material transformation event. The organic material proximate the core, therefore, does not burnout until a later time and at a higher temperature than is desirable, thereby causing stresses within the core of the structure which may lead to internal cracking. In other words, the exothermic reaction caused by organic material burnout in the core of the structure (so-called "core light off") may be delayed by too quickly increasing the firing environment temperature, resulting in an overlap of the exothermic burnout events and the subsequent endothermic clay dehydration event. Consequently, the inventor has discovered that internal cracking occurs in a second stage of the initial firing regime due to this delayed exothermic reaction, which in turn causes an overlap of organic material burnout with clay dehydration proximate the structure's core. The inventor has further discovered that such cracking can be prevented by, for example, controlling the timed temperature cycle in the first stage of the initial firing regime.

It was further discovered that the maximum difference in temperature between the structure's core and the structure's skin ($\Delta T$), or the maximum core/skin temperature differential, in a second stage of the initial firing regime (e.g., a clay stage) may also influence internal cracking. The inventor has discovered that a green structure can withstand large negative core/skin temperature differentials (e.g., where a temperature taken at a location proximate a middle, core portion of the green structure is less than a temperature taken at a location proximate a top, skin portion of the green structure), but exhibits cracking when exposed to large positive core/skin temperature differentials (e.g., where a temperature taken at a location proximate a middle core portion of the green structure is greater than a temperature taken at a location proximate a top, skin portion of the green structure). A large positive core/skin temperature differential (e.g., a positive maximum difference in temperature ($\Delta T$)) in the clay stage of firing may indicate a delayed exothermic organic-burnout reaction in the core, and, therefore, an overlap of exothermic burnout with endothermic clay dehydration. Conversely, a negative core/skin temperature differential (e.g., a negative maximum difference in temperature ($\Delta T$)) in the clay stage of firing may indicate that the above overlap was avoided.

The present teachings contemplate methods of firing a green structure that reduce and/or eliminate internal cracking during firing by avoiding overlap of organic material burnout and clay dehydration transformation events proximate a core of the ceramic structure. The present teachings also contemplate minimizing a structure's firing cycle length while reducing and/or eliminating internal cracking. In other words, various exemplary embodiments of the present teachings consider methods of firing that combine the above two discoveries of heating a firing environment during a first stage of an initial firing regime over a first timed temperature cycle having an average ramp rate sufficient to substantially complete burnout of organic material prior to initiation of clay dehydration proximate a core of the ceramic structure (e.g., spending sufficient time in the BO stage to prevent overlap of organic-burnout and clay dehydration), and heating the firing environment during a second stage of the initial firing regime over a second, faster timed temperature cycle (e.g., using an increased average ramp rate during the clay dehydration stage to make up for the slower firing time during the first stage).

The present teachings further contemplate methods of firing a green structure that reduce and/or eliminate internal cracking during firing by avoiding large positive core/skin temperature differentials (e.g., where a temperature taken at a location proximate a middle core portion of the green structure is greater than a temperature taken at a location proximate a top, skin portion of the green structure) during a second stage of the initial firing regime (i.e., the clay dehydration stage).

The present teachings provide methods of firing a green structure to produce a ceramic structure which allow for reduction of the length of time of the structure's firing cycle, while preventing internal cracking, thereby providing increased survivability for a broad range of product types without requiring the addition of expensive gases and/or other firing additives to the batch. For example, in various exemplary embodiments of the present teachings, firing cycles are disclosed for cordierite diesel filter products, such as, for example, light-duty diesel (LDD) filters and heavy-duty diesel (HDD) filters, conventionally used in diesel particulate filter (DPF) systems. Although specific firing stages, timed temperature cycles and firing cycles are disclosed for various cordierite light-duty diesel and cordierite heavy-duty diesel filters, those ordinarily skilled in the art would understand that the present teachings may be applied to any clay-based ceramic structure, including, but not limited to, any clay-based cordierite structure.

As used herein, the term "ceramic structure" or "structure" refers to a ceramic article produced by forming raw materials comprising clay material and organic material (i.e., binder material and pore-forming agents) into a green structure and firing. Exemplary ceramic structures include, for example, porous cellular ceramic structures, including, but not limited to, for example, particulate filter structures, industrial liquid filter structures and catalyst substrate structures. The particulate filter structures in accordance with exemplary embodiments of the present teachings may be capable of removing particulate matter from a fluid stream passing through the channels of the filter (e.g., LDD and HDD filters). Exemplary particulate filters of the present teachings may apply to the removal of any particulate matter from any fluid stream, and the fluid stream may be in the form of a gas or a liquid. The gas or liquid may also contain another phase, such as a solid particulate in either a gas or liquid stream, or droplets of liquid in a gas stream. Non-limiting, exemplary fluid streams include exhaust gases produced by internal combustion engines, such as, for example, diesel and gasoline engines, aqueous liquid streams, and coal combustion flue gases produced in a coal gasification process. Thus, although in various exemplary embodiments LDD and HDD particulate filters are described, the present teachings apply to other porous ceramic structures used to filter fluid streams, including, but not limited to, for example, porous ceramic structures used for mercury and other toxic elements abatement and industrial liquid filtration applications.

The ceramic structures in accordance with the present teachings can have any shape or geometry suitable for a particular application, as well as a variety of configurations and designs, including, but not limited to, for example, a wall-flow monolith structure, a flow-through monolith structure, or a partial-flow monolith structure (i.e., any combination of a wall-flow monolith structure and a flow-through monolith structure). Exemplary wall-flow monoliths include, for example, any monolithic structure comprising channels or porous networks or other passages with individual passages open and plugged at opposite ends of the structure, thereby enhancing fluid flow through the channel walls of the monolith as the fluid flows from one end to the other. Exemplary flow-through monoliths include, for example, any monolithic structure comprising channels or porous networks or other passages with individual passages open at both ends, thereby permitting the flow of a fluid stream through the monolith passages from one end to an opposite end. Exemplary partial-flow monoliths include, for example, any monolithic structure that is partially wall-flow and partially flow-through.

Figure 2:
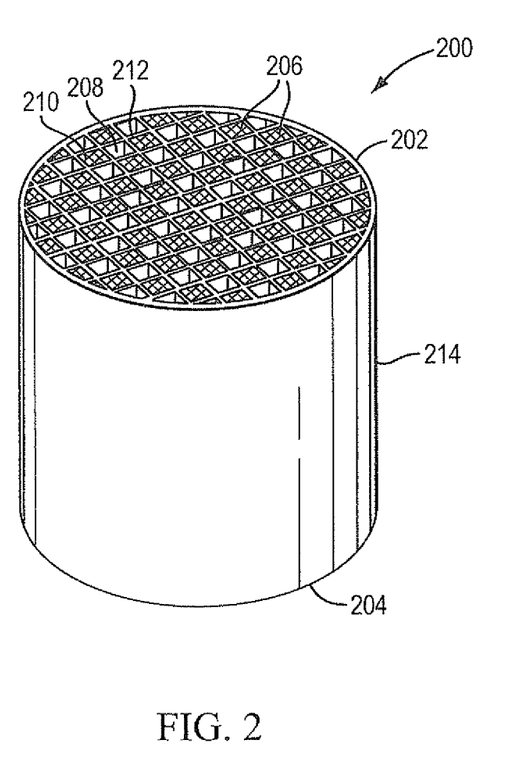
FIG. 2 is a perspective view of an exemplary embodiment of a ceramic structure in accordance with the present teachings.

FIG. 2 illustrates one exemplary embodiment of a ceramic structure in accordance with the present teachings. The ceramic structure 200 has an inlet end 202 an outlet end 204, and a plurality of channels 208, 210 extending from the inlet end 202 to the outlet end 204. The channels 208, 210 are defined by intersecting porous walls 206, thereby forming a generally cellular configuration (sometimes referred to as a honeycomb configuration by those ordinarily skilled in the art). Although the ceramic structure 200 is depicted with channels having a substantially square cross-section (i.e., in a plane perpendicular to a longitudinal axis of the structure 200), those ordinarily skilled in the art would understand that channels 208, 210 can have various additional geometries, such as, for example, cross-sections that are circular, square, triangular, rectangular, hexagonal, sinusoidal, or any combination thereof, without departing from the scope of the present teachings.

Additionally, although the ceramic structure 200 is depicted as cylindrical, those skilled in the art would understand that such shape is exemplary only and ceramic structures produced in accordance with the present teachings may have a variety of shapes, including, but not limited to, block-shaped, cube-shaped, pyramid-shaped, etc.

The ceramic structure 200 may be made of any suitable clay-based material. Exemplary materials include a variety of clay-based ceramic materials, including, but not limited to, cordierite, silicon carbide, silicon nitride, aluminum titanate, and mullite. In various exemplary embodiments, the ceramic structure 200 may be formed as a monolithic structure, for example, via extruding and/or molding of raw materials into a green structure that is then fired. Those having ordinary skill in the art are familiar with the various techniques for extruding and/or molding such green monolithic structures.

Ceramic structures in various exemplary embodiments also may include a skin, for example skin 214, forming an outer peripheral lateral surface of the structure. The skin may be made of the same or a different material than the porous walls, and in various embodiments may be thicker than the porous walls. In various exemplary embodiments, the skin may be extruded and/or molded with the other portions of the green structure. In various other exemplary embodiments, the skin may be a separate structure wrapped around the outer portions of the channel network and fired with the channel network to create the ceramic structure.

As discussed above, the overlap of organic material burnout (an exothermic event) and clay dehydration (an endothermic event) in a ceramic structure's core may lead to internal thermally-induced stresses, which result in internal cracking of the structure. As will be described in more detail below, the inventor has discovered that this overlap may be avoided; thereby increasing product survivability, by spending a predetermined amount of time (e.g., a predetermined minimum time period) at and/or under a threshold temperature to allow for organic material burnout to be substantially completed before clay dehydration begins. In one exemplary embodiment, the present teachings contemplate accomplishing prevention of the overlap by heating the firing environment at a first, relatively slow timed temperature cycle during a first stage of the initial firing regime to substantially complete organic material burnout prior to initiation of clay dehydration proximate the core of the green structure, and then ramping up by heating the firing environment at a faster timed temperature cycle during a second stage of the initial firing regime. In another exemplary embodiment, the present teachings contemplate that the overlap can be avoided by initially heating the firing environment at a relatively fast timed temperature cycle during a first stage of the initial firing regime, holding the firing environment at a threshold temperature for a period of time to allow for the substantial completion of organic material burnout prior to initiation of clay dehydration proximate the core, and then resume heating the firing environment at a relatively fast timed temperature cycle during a second stage of the initial firing regime. Regardless of the particular timed temperature cycle selected in the first and second stages of firing during the initial firing regime, the present teachings contemplate selecting the timed temperature cycles so as to avoid the overlap of organic material burnout and clay dehydration events occurring proximate the core of the green structure while providing an overall shortened (e.g., minimized) time to completion of the initial firing regime and thereby a shortened (e.g., minimized) overall firing cycle time.

As used herein, the term "firing cycle" refers to the complete time-temperature profile starting with the initial firing regime through the completion of cool down to produce a ceramic structure. In other words, the term "firing cycle" encompasses each of the three general regimes (e.g., 101, 102, and 103 in FIG. 1) that occur during the structure's formation, and can include any number of different timed temperature cycles.

As used herein, the term "timed temperature cycle" refers to the change in firing environment temperature over a period of time, including, for example, variable rate temperature increases averaged over a period of time (i.e., variable ramp rates), constant temperature increases (i.e., constant ramp rates), temperature holds (i.e., holding constant at a certain temperature) and/or any combination thereof. As used herein, the term a "first timed temperature cycle having an average ramp rate sufficient to substantially complete burnout of organic material prior to initiation of clay dehydration proximate the core of the ceramic structure" refers to a timed temperature cycle that provides about 90% or greater organic weight loss and/or completion of the exothermic reactions involving organic material proximate a core of the ceramic structure prior to the initiation of the endothermic event involving clay dehydration proximate a core of the structure, for example, resulting in negligible heat production at temperatures greater than or equal to about 400° C., for example greater than or equal to about 425° C.

For a given timed temperature cycle, ordinarily skilled artisans would understand how to determine whether or not organic material burnout was substantially complete prior to initiation of clay dehydration by plotting a ceramic structure's core/skin temperature differential ($\Delta T$), calculated as $T_{mid\text{-}core} - T_{top\text{-}skin}$, against the ceramic structure's skin temperature (see, e.g., FIG. 4), and looking for the presence of any large positive ΔT values (e.g., positive peaks) in the skin temperature range corresponding to the clay dehydration stage (e.g., about 400° C. to about 600° C.). Positive ΔT values greater than about 30° C. in any part of the clay dehydration stage can indicate that organic material burnout overlapped clay dehydration. In other words, when ΔT vs. skin temperature is plotted, if ΔT is less than about 30° C. in the skin temperature range corresponding to the clay dehydration stage of the initial firing regime, the substantial completion of burnout of organic material occurred prior to initiation of clay dehydration proximate the core of the ceramic structure.

As discussed above, the present teachings disclose the inventor's discovery of a theory of why internal cracking of a ceramic structure occurs during some firing cycles (e.g., those at relatively high firing ramp rates throughout the cycle) of a green structure. More specifically, internal cracking occurs in a second stage of an initial firing regime (e.g., during a clay dehydration stage) due to a delayed exothermic reaction, which in turn causes an overlap of organic material burnout with clay dehydration proximate a structure's core. To fully understand the problem, the inventor used experimental firing cycles to isolate these critical timed temperature cycles for various exemplary cordierite light-duty diesel filters, as shown and described below with reference to FIGS. 2-7. To determine an approximate minimum firing cycle length (e.g., limits for fast firing) for a cordierite light-duty diesel filter, various multi-day firing cycles (6-Day, 5-Day, 4-Day and 3-Day) were tested, the results of which are plotted in FIG. 3 for the first and second stages of the initial firing regime. In each firing cycle, changes were made to the initial firing regime ramp rates (i.e., in a firing environment temperature range of from about 180° C. to about 750° C.) from a baseline, 80-hour period cycle, represented by the 7-Day cycle plotted in FIG. 3. That is, in the baseline cycle, the second stage of the initial firing regime was completed after about 80 hours. The table set forth below summarizes the cracking results for the firing cycles illustrated in FIG. 3 for both 5.66 inch diameter by 6 inch long (5.66"×6") cordierite light-duty diesel filters and 7 inch diameter by 6 inch long (7"×6") cordierite light-duty diesel filters. For the various results described herein, cracking was determined via a visual inspection of vertical and/or horizontal sections of each tested filter.

TABLE 1

Figure 3:
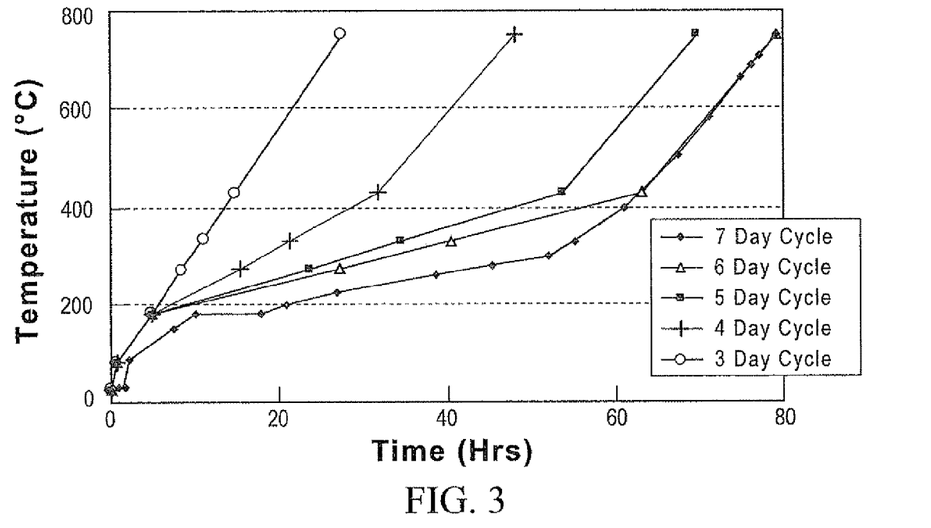
FIG. 3 is a graph illustrating the first and second stages of the initial regime for various experimental multi-day firing cycles for light-duty diesel filters.

Cracking Results for the Firing Cycles Illustrated in FIG. 3

| Cycle (time to completion of 2nd stage of initial firing regime) | % Cracking for 5.66" × 6" Filters (# of filters tested) | % Cracking for 7" × 6" Filters (# of filters tested) |
|---|---|---|
| 7-Day (80 Hrs) | 0% (15) | 0% (39) |
| 6-Day (80 Hrs) | 0% (1) | N/A |
| 5-Day (70 Hrs) | 0% (3) | N/A |
| 4-Day (49 Hrs) | 0% (5) | 0% (3) |
| 3-Day (28 Hrs) | 17% (6) | 100% (3) |

As shown in Table 1, as the firing cycle was decreased from 4 days to 3 days, the filters started to crack. That is, for the 3-Day cycle, 1 out of 6 of the 5.66"×6" filters were observed to have cracked (i.e., 17%) and 3 out of 3 of the 7"×6" filters were observed to have cracked (i.e., 100%). As illustrated by FIG. 3, the main difference between the 4-Day cycle and 3-Day cycle was the timed temperature cycle employed during the first stage of firing in the initial firing regime (i.e., during the BO stage defined, in this case, as ranging from about 180° C. to about 425° C.). More specifically, the timed temperature cycle for the 4-Day cycle used an average ramp rate of about 9° C./hr over this temperature range while the 3-Day cycle used an average ramp rate of about 25° C./hr.

Figure 4:
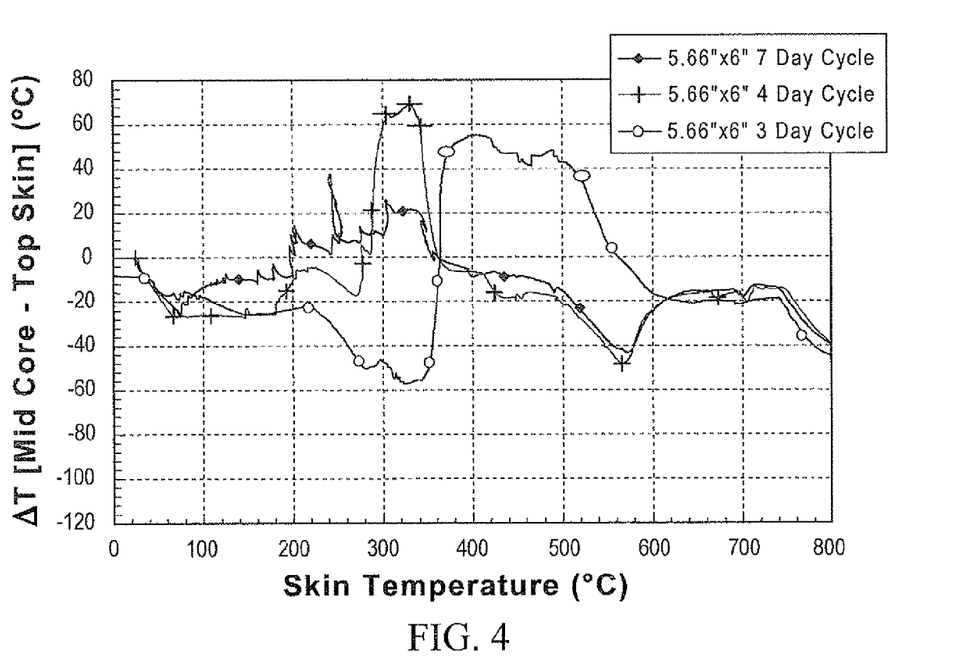
FIG. 4 is a graph illustrating core/skin temperature differential ($\Delta T$) as a function of skin temperature for the 3-Day, 4-Day and 7-Day firing cycles of FIG. 3.

Referring now to FIG. 4, to further understand the cracking phenomenon, core/skin temperature differential (ΔT), calculated as the difference of the temperature proximate a middle, core portion of the filter and the temperature proximate an outer, top surface of the filter ($T_{mid-core} - T_{top-skin}$), data was collected and plotted as a function of skin temperature for the 3-Day and 4-Day firing cycles of FIG. 3, for the 5.66"×6" cordierite light-duty diesel filters. As shown by FIG. 4, a substantial change in the core/skin temperature differential occurred when the firing cycle was reduced from a 4-Day cycle to a 3-Day cycle. In comparison to the 4-Day cycle, the 3-Day cycle exhibited a positive ΔT peak (i.e., a maximum positive core/skin temperature differential) in the skin temperature range of from about 400° C. to about 525° C., corresponding to the clay dehydration stage.

Figure 5:
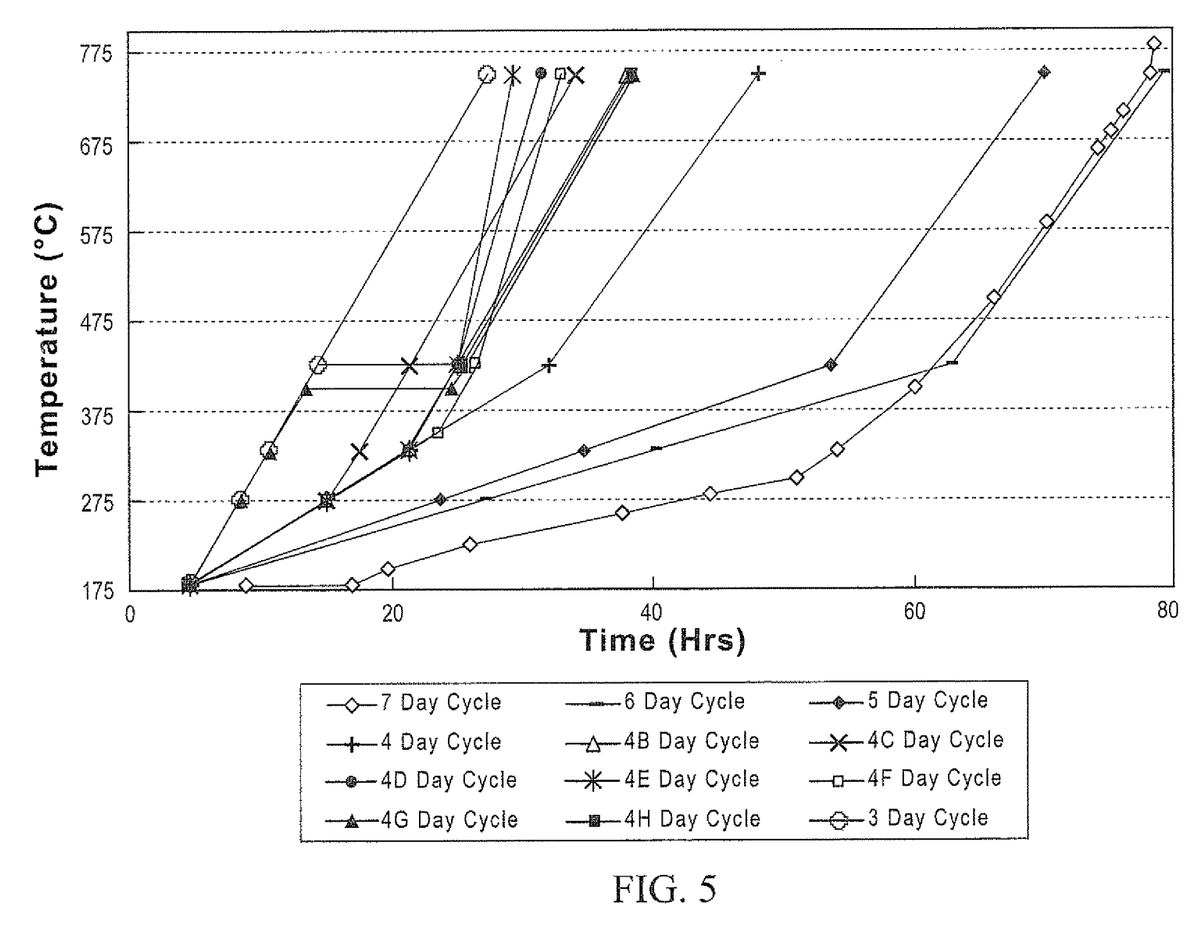
FIG. 5 is a graph illustrating the first and second stages of the initial regime for various experimental firing cycles for light-duty diesel filters.
Figure 6:
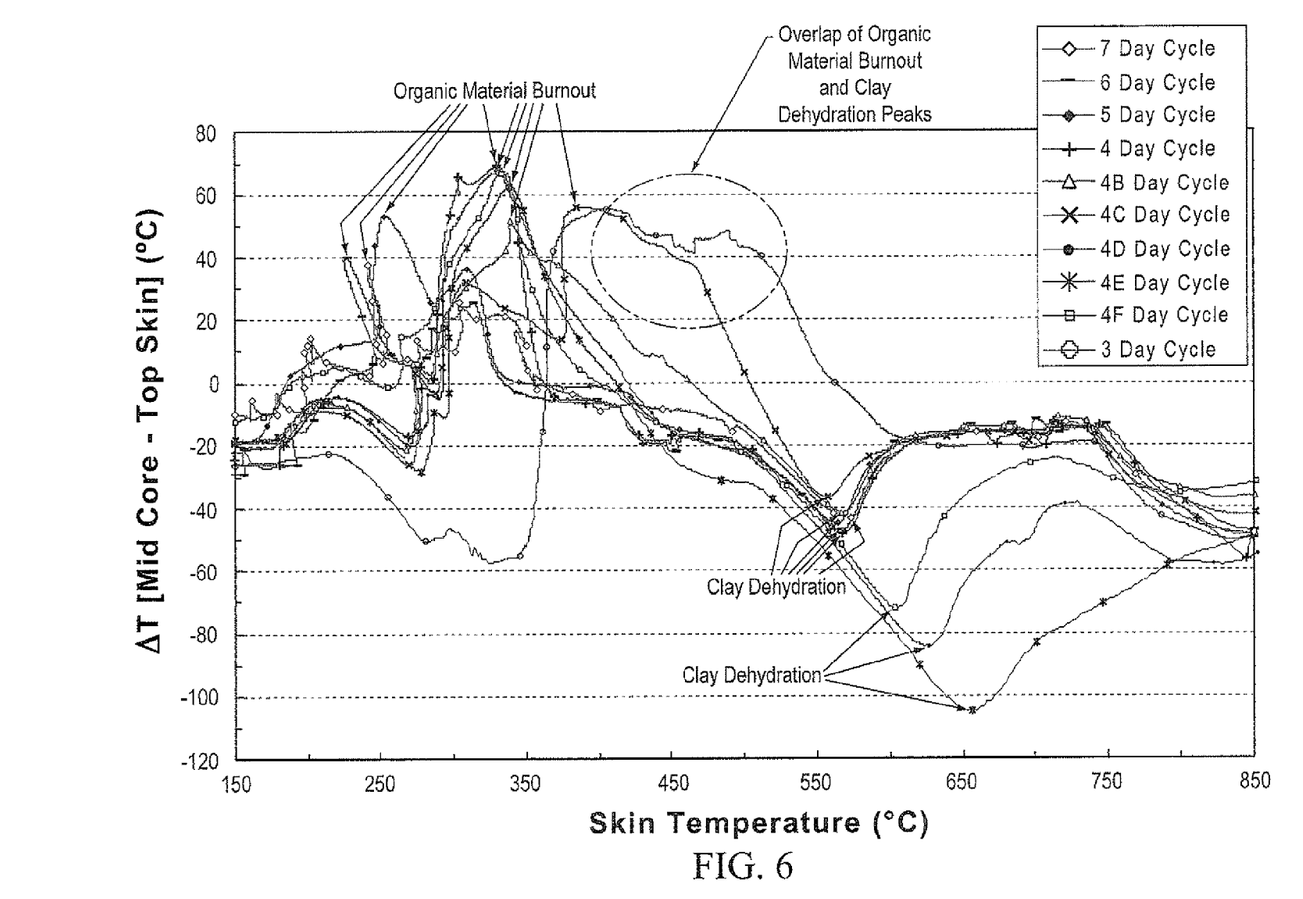
FIG. 6 is a graph illustrating core/skin temperature differential ($\Delta T$) as a function of skin temperature for the various experimental firing cycles of FIG. 5 for light-duty diesel filters.
Figure 7:
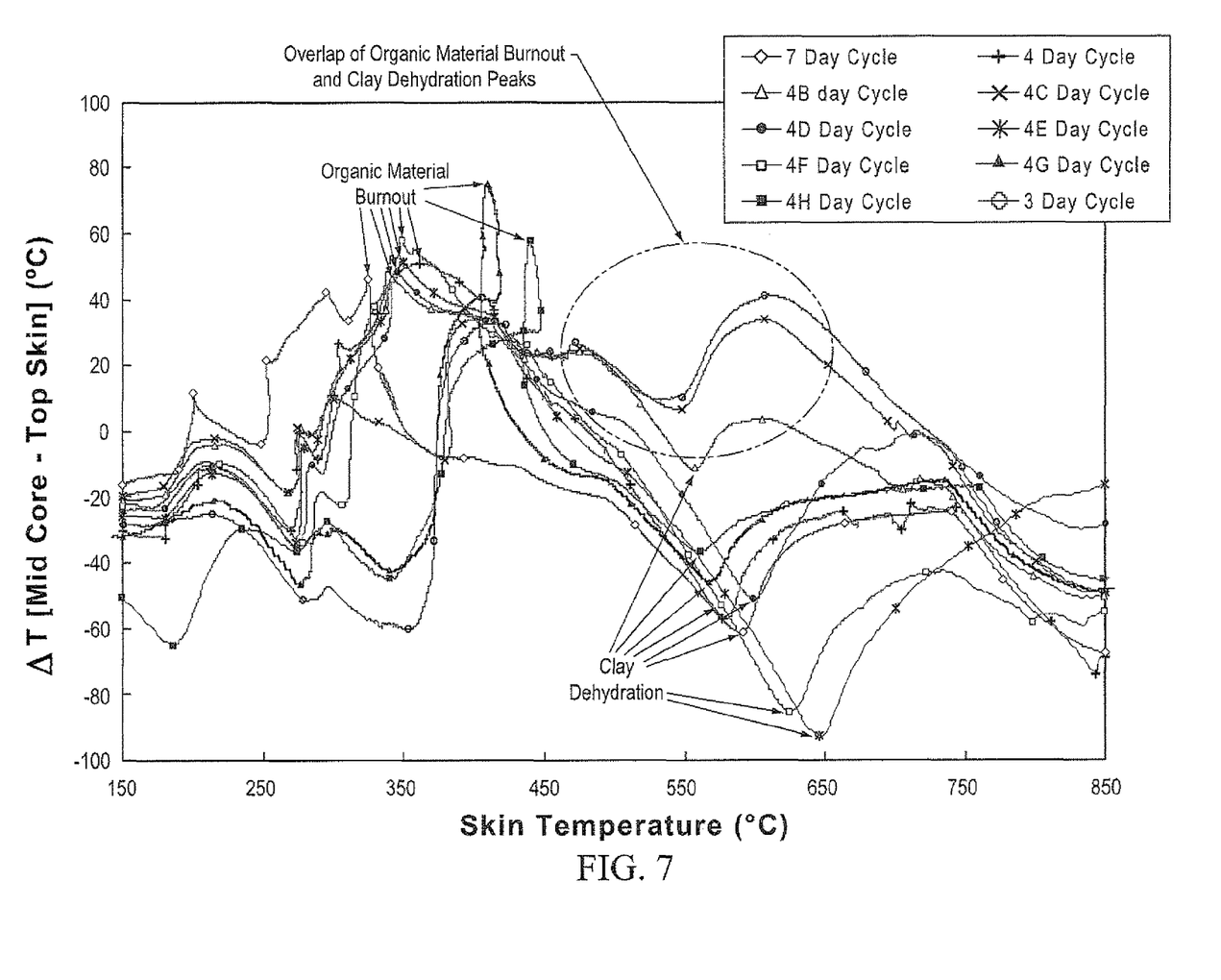
FIG. 7 is a graph illustrating core/skin temperature differential ($\Delta T$) as a function of skin temperature for the various experimental firing cycles of FIG. 5 for light-duty diesel filters.

To better understand the interrelation of the cracking mechanism and the change exhibited by the ΔT curve from the 4-Day cycle to the 3-Day cycle, further experiments were performed and the results illustrated in FIGS. 5-7. In FIG. 5, various experimental firing cycles (4B-Day, 4C-Day, 4D-Day, 4E-Day, 4F-Day, 4G-Day and 4H-Day) were tested in addition to the cycles described above with reference to FIG. 3 for both 5.66"×6" and 7"×6" light-duty diesel filters. As above, as shown in FIG. 5, in each firing cycle, changes were made to the timed temperature cycles in the first and second stages of the initial firing regime (corresponding to a firing temperature range of from about 180° C. to about 750° C.) from a baseline 80-hour period cycle represented by the 7-Day cycle plot and from the 49-hour and 28-hour period cycles represented respectively by the 4-Day cycle plot and the 3-Day cycle plot in FIG. 5 (the 3-Day and 4-Day cycles of FIG. 5 being the same as those shown in FIG. 3).

As shown in FIG. 5, the 4B-Day, 4D-Day and 4E-Day cycles employed a slight increase in average ramp rate from the rate used in the 4-Day cycle during a first portion of the first stage of the initial firing regime (in this case, over a temperature range of from about 180° C. to about 350° C.), with a more significant increase in average ramp rate employed during a second portion of the first stage (in this case, over a temperature range of from about 350° C. to about 425° C.). This resulted in an overall increase in average ramp rate from the rate used in the 4-Day cycle over the complete first stage of the initial firing regime (i.e., a BO stage, in this case, over the temperature range of from about 180° C. to about 425° C.). The 4B-Day, 4D-Day and 4E-Day cycles also respectively increased their average ramp rates during the second stage of the initial firing regime (i.e., a clay dehydration stage, in this case, over a temperature range of from about 425° C. to about 750° C.). The 4C-Day cycle employed a more significant increase in average ramp rate from the rate used in the 4-Day cycle during the first portion of the first stage of the initial firing regime (in this case, over a temperature range of from about 180° C. to about 275° C.), and thereby an increase in initial average ramp rate from the rate used in the 4B-Day, 4D-Day and 4E-Day cycles over the temperature range of from about 180° C. to about 350° C., as well as an increase in the overall average ramp rate over the complete first stage of the initial firing regime (i.e., a BO stage, in this case, over the temperature range of from about 180° C. to about 425° C.). The 4F-Day cycle employed the same approximate average ramp rate as the rate used in the 4-Day cycle during the first portion of the first stage of the initial firing regime (in this case, over the temperature range of from about 180° C. to about 350° C.), with a significant increase in average ramp rate employed during the remaining portion of the first stage (in this case, over a temperature range of from about 350° C. to about 425° C.), which thereby resulted in an overall decrease in average ramp rate from the rate used in the 4B-Day, 4D-Day and 4E-Day cycles over the complete first stage of the initial firing regime (i.e., a BO stage, in this case, over the temperature range of from about 180° C. to about 425° C.). The 4G-Day cycle employed the same approximate average ramp rate as the 3-Day cycle, up to an approximate 10-hour hold at 400° C., during a first stage of the initial firing regime (i.e., a BO stage, in this case, over a temperature range of from about 180° C. to about 425° C.), which thereby resulted in a relatively high initial average ramp rate from about 180° C. to about 350° C., followed by a relatively low average ramp rate from about 350° C. to about 425° C. Similarly, the 4H-Day cycle employed the same approximate ramp rate as the 3-Day cycle, up to an approximate 10 hour hold at 425° C., during a first stage of the initial firing regime (i.e., a BO region, in this case, over a temperature range of from about 180° C. to about 425° C.), which thereby also resulted in a relatively high initial average ramp rate from about 180° C. to about 350° C., followed by a relatively low average ramp rate from about 350° C. to about 425° C. Consequently, the 4G-Day and 4H-Day cycles resulted in an increase in average ramp rate from the rate used in the 4-Day cycle, and a slight decrease in average ramp rate from the rate used in the 4B-Day, 4D-Day and 4E-Day cycles, over the complete first stage of the initial firing regime (i.e., a BO stage, in this case, over the temperature range of from about 180° C. to about 425° C.).

The table below summarizes the cracking results for the firing cycles illustrated in FIG. 5 for both 5.66"×6" cordierite light-duty diesel and 7"×6" cordierite light-duty diesel filters.

TABLE 2

Cracking Results for the Firing Cycles Illustrated in FIG. 5

| Firing Cycle (time to completion of 2nd stage of initial firing regime) | % Cracking for 5.66" × 6" Filters (# of filters tested) | % Cracking for 7" × 6" Filters (# of filters tested) |
|---|---|---|
| 4B-Day (39 Hrs) | 0% (4) | 0% (4) |
| 4C-Day (35 Hrs) | 0% (3) | 50% (4) |
| 4D-Day (32 Hrs) | 0% (4) | 0% (5) |
| 4E-Day (30 Hrs) | 0% (3) | 0% (4) |
| 4F-Day (34 Hrs) | 0% (15) | 0% (14) |
| 4G-Day (39 Hrs) | 0% (3) | 0% (3) |
| 4H-Day (39 Hrs) | N/A | 0% (1) |

As shown in Table 2, cycles 4B-Day, 4D-Day, 4E-Day, 4F-Day, 4G-Day and 4H-Day were crack free, however, cycle 4C-Day exhibited cracking in 50% of the 7"×6" filters (2 out of 4 filters tested were observed to have cracked). Consequently, the inventor concluded that the ramp rates employed during the first stage of the initial firing regime (i.e., in the BO temperature region) are important to crack prevention. Once organic material burnout (e.g., burnout of methocel and starch) is complete, however, the inventor concluded that the average ramp rate can be increased freely without leading to cracking of the ceramic structure during firing. Based on the results in Table 2, for a cordierite light-duty diesel filter, the average rate employed over a first stage of the initial firing regime, for example, in a temperature range of from about 180° C. to about 425° C., can influence internal cracking (see cycle 4C-Day), whereas, the average rate employed during the second stage of the initial firing regime, for example, in a temperature range of from about 425° C. to about 750° C., does not have a significant influence (see cycles 4D-Day and 4E-Day). Consequently, cycles 4B-Day, 4D-Day, 4E-Day, 4F-Day, 4G-Day and 4H-Day demonstrate prevention of internal cracking when using relatively short timed temperature cycles for the first and second stages of the initial firing regime (and thereby relatively short overall firing cycles), for example, wherein the time to completion of the second stage of the initial firing regime is less than or equal to about 39 hours for the experiments shown.

Although the results above demonstrate that timed temperature cycles may be used in accordance with exemplary embodiments of the present teachings, for example, for light-duty filters, wherein the time from the initiation of the firing cycle to the completion of the second stage is less than or equal to about 39 hours, it is contemplated that timed temperature cycles that result in a longer time to completion of the second stage, while still being less than the 80-hour time to completion of the second stage for the baseline 7-Day cycle described above, also are within the scope of the invention. Thus, in various exemplary embodiments, it is contemplated that the time from initiation of the firing cycle to the completion of the second stage of the initial firing regime may be less than or equal to about 62 hours.

The table below summarizes the average ramp rates of the timed temperature cycles employed during the first and second stages of the initial firing regime for the firing cycles illustrated in FIG. 5.

TABLE 3

Average Ramp Rates for the Firing Cycles Illustrated in FIG. 5

|  | 180°-425° C. Average Ramp Rate | 180°-350° C. Average Ramp Rate | 350°-425° C. Average Ramp Rate | 425° to 750° C. Average Ramp Rate |
|---|---|---|---|---|
| 7-Day | 4.7 | 3.6 | 8.1 | 19.6 |
| 6-Day | 4.2 | 4.2 | 4.2 | 20 |
| 5-Day | 5 | 5 | 5 | 20 |
| 4-Day | 9 | 9 | 9 | 20 |
| 3-Day | 25 | 25 | 25 | 25 |
| 4B-Day | 12 | 9.7 | 25 | 25 |
| 4C-Day | 14.8 | 12.5 | 25 | 25 |
| 4D-Day | 12 | 9.7 | 25 | 50 |
| 4E-Day | 12 | 9.7 | 25 | 75 |
| 4F-Day | 11.2 | 9 | 25 | 50 |
| 4G-Day | 11.8 | 25 | 5.4 | 25 |
| 4H-Day | 11.8 | 25 | 5.4 | 25 |

As above, for cordierite light-duty diesel filters, the inventor concluded that the ramp rates employed during the first stage of the initial firing regime (i.e., in a temperature range of from about 180° C. to about 425° C.) were important to internal crack prevention. Consequently, as shown in Tables 2 and 3, cycles 4B-Day, 4D-Day, 4E-Day, 4F-Day, 4G-Day and 4H-Day demonstrate prevention of cracking when using relatively short cycles for the first and second stage of the initial firing regime (and thereby relatively short overall firing cycles), wherein heating the firing environment during the first stage comprises heating the firing environment at an average ramp rate of less than or equal to about 12° C./hr, for example, an average ramp rate ranging from about 4.2° C./hr to about 12° C./hr, (i.e., a timed temperature cycle encompassing any number of rates and holds utilized in the temperature range of from about 180° C. to about 425° C. but yielding an average ramp rate of less than or equal to about 12° C./hr).

Once organic material burnout (e.g., burnout of methocel and starch) is complete, however, the average ramp rate can be increased freely without leading to internal cracking of the ceramic structure during firing. Consequently, as shown in Tables 2 and 3, cycles 4B-Day, 4D-Day, 4E-Day, 4F-Day, 4G-Day and 4H-Day demonstrate prevention of cracking when using a relatively short cycle for the first and second stages of the initial firing regime (and thereby an relatively short overall firing cycle), wherein heating the firing environment during the second stage of the initial firing regime comprises heating the firing environment at an average ramp rate of less than or equal to about 75° C./hr, for example, an average ramp rate ranging from about 12° C./hr to about 75° C./hr, (i.e., a timed temperature cycle encompassing any number of rates utilized in the temperature range of from about 425° C. to about 750° C. but yielding an average ramp rate of less than or equal to about 75° C./hr.)

As shown in Table 3, and as described above, the first stage of the initial firing regime can also be broken down into two portions, a first portion in the temperature range of from about 180° C. to about 350° C., and a second portion in the temperature range of from about 350° C. to about 425° C., which correspond to two separate burnout events within the first stage of the initial firing regime. In the first portion of the first stage, organic material burns out; however, an amount of char from the organic material remains. In the second portion of the first stage, the remaining char of the organic material burns out. The inventor therefore concluded that the average ramp rate employed during each portion of the first stage of the initial firing regime also impacted crack prevention. Consequently, as shown in Tables 2 and 3, cycles 4B-Day, 4D-Day, 4E-Day, 4F-Day, 4G-Day and 4H-Day demonstrate prevention of internal cracking when using a relatively short cycle for the first and second stages of the initial firing regime (and thereby a relatively short overall firing cycle), wherein heating the firing environment during the first stage comprises heating the firing environment from about 180° C. to about 350° C. at an average ramp rate of less than or equal to about 25° C./hr, for example, an average ramp rate ranging from about 3.6° C./hr to about 25° C./hr, and heating the firing environment from about 350° C. to about 425° C. at an average ramp rate of less than or equal to about 25° C./hr, for example, an average ramp rate ranging from about 4.2° C./hr to about 25° C./hr.

To better understand the stages of the initial firing regime and their effect on ΔT, as above, in FIG. 6, core/skin temperature differential (ΔT) data was plotted as a function of skin temperature for the firing cycles of FIG. 5 for 5.66"×6" cordierite light-duty diesel filters. As illustrated in FIG. 6, each peak (both negative and positive) can be related to a specific event in each firing cycle. The identification of these peaks, which represent the relative maximum positive or relative maximum negative core/skin temperature differentials exhibited by the cordierite LDDs tested at the various firing cycles, help to explain the substantial change exhibited by the ΔT curve from the 4-Day cycle to the 3-Day cycle. As above, in comparison to the 4-Day cycle, the 3-Day cycle exhibited a positive ΔT peak (i.e., a maximum positive core/skin temperature differential) in a temperature range of from about 400° C. to about 525° C. (i.e. the clay dehydration stage). The inventor discovered that this large positive ΔT peak, which exceeds about 30° C., was a result of a negative ΔT peak (i.e., a maximum negative core/skin temperature differential) at about 325° C. That is, because of the high heating rates in the first stage of the initial firing regime (i.e., the BO stage), the temperature differential between the structure's core and the structure's skin increased, which in turn postponed the exothermic reaction in the core (i.e., burnout of binder and pore forming agent). The heat released from this exothermic reaction is not easily dissipated and causes the core temperature to remain higher relative to the skin temperature for a long period of time, therefore, causing an overlap between the exothermic reaction and the subsequent clay dehydration endothermic event. In other words, after organic material burnout in the core (i.e., "core light off"), the structure is not given sufficient time to cool relative to the skin prior to initiation of clay dehydration, creating an overlap of the events, and high positive ΔT values (represented by a maximum positive core/skin temperature differential that exceeded about 30° C. in the clay dehydration stage of the initial firing regime, that took place in the temperature range of from about 400° C. to about 525° C. of FIG. 6). Accordingly, in comparison to the 4-Day cycle, the 3-Day cycle exhibited an overlap of organic material burnout and clay dehydration (the first and second stages of the initial firing regime), and thus resulted in internal cracking of the structure. To the contrary, each of the 4B-Day, 4D-Day, 4E-Day, 4F-Day, 4G-Day and 4H-Day cycles avoided this overlap for the 5.66"×6" structures, as illustrated by the absence of any positive ΔT values exceeding about 30° C. in the skin temperature range corresponding to the clay dehydration stage. In other words, since the core/skin temperature differential (ΔT) in each cycle continuously decreased throughout the clay dehydration stage (i.e., no increase in ΔT), there was no overlap between the organic material burnout and clay dehydration peaks, as exhibited by the large ΔT peak in the 3-Day cycle.

Similarly, in FIG. 7, core/skin temperature differential (ΔT) was plotted as a function of skin temperature for the firing cycles of FIG. 5 for 7"×6" cordierite light-duty diesel filters. As shown by FIG. 7, once again, each of the 4B-Day, 4D-Day, 4E-Day, 4F-Day, 4G-Day and 4H-Day cycles avoided overlap of organic material burnout and clay dehydration stages of the initial firing regime proximate a core of the structures. As shown in FIG. 7, however, the 4C-Day cycle did not, thereby resulting in cracking in 50% of the 7"×6" structures tested. Consequently, based on the above, the inventor has discovered that a cycle that avoids the overlap of organic material burnout and clay dehydration proximate the core region of the green structure can lead to minimized or prevention of internal cracking. In other words, heating a firing environment during a first stage of the initial firing regime over a first timed temperature cycle having an average ramp rate sufficient to substantially complete burnout of organic material prior to initiation of clay dehydration in a core of a structure (i.e., to avoid overlap) can increase survivability by minimizing or preventing internal cracking.

Based on the above 3-Day and 4C-Day cycles, it was further concluded that the sign of the ΔT values (e.g., the ΔT peak) in a second stage of the initial firing regime (i.e., the clay dehydration stage) can indicate whether or not organic material burnout was substantially complete prior to clay dehydration. Large positive ΔT values, such as, for example, greater than about 30° C., can cause an overlap of the organic material burnout and clay dehydration events, thereby, causing the structure's core to shrink ahead of the structure's skin, resulting in internal cracks. Accordingly, to substantially avoid this overlap (i.e., to ensure that the burnout of organic material is substantially complete prior to initiation of clay dehydration proximate the core of the ceramic structure), the timed temperature cycle used in the first stage of the initial firing regime can be adjusted until there are no ΔT values which exceed 30° C. in the second stage of the initial firing regime (i.e., the clay dehydration stage). In practice, however, to avoid overlap of organic material burnout and clay dehydration (i.e., to ensure that the burnout of organic material is complete prior to initiation of clay dehydration proximate the core of the ceramic structure), it may be desirable to select a first timed temperature cycle such that no ΔT values exceed about 0° C. in the second stage of the initial firing regime (i.e., the clay dehydration stage).

This discovery was tested in experimental cycles 4G-Day and 4H-Day. As illustrated in FIG. 7, in the 4G-Day cycle, a 7"×6" cordierite LDD structure was fired using an experimental cycle that held the firing at about 400° C. over a time period, so that the structure developed high positive ΔT values during the first stage of the initial firing regime (i.e., the BO stage), but not for the second stage of the initial firing regime (i.e., the clay dehydration stage). Similarly, in the 4H-Day cycle, a 7"×6" cordierite LDD structure was fired using an experimental cycle that held the firing at a temperature of about 425° C. over a time period, so that the structure developed high positive ΔT values during the first stage of the initial firing regime (i.e., the BO stage), but not for the second stage of the initial firing regime (i.e., the clay dehydration stage). Consequently, based on the above, a firing cycle that manages to avoid the overlap of organic material burnout and clay dehydration proximate the core of a green structure by firing the green structure up to and/or at a threshold temperature for a sufficient period of time (e.g., increasing the firing environment up to a threshold temperature within a minimum period of time, and/or holding the firing environment at a threshold temperature for a minimum period of time) during the first stage of the initial firing regime can lead to minimizing or prevention of internal cracking. In other words, heating a firing environment to a first threshold temperature over a first time period sufficient to substantially complete burnout of the organic material prior to initiation of dehydration of the clay material proximate a core region of the structure (i.e., to avoid overlap) can increase survivability.

Figure 8:
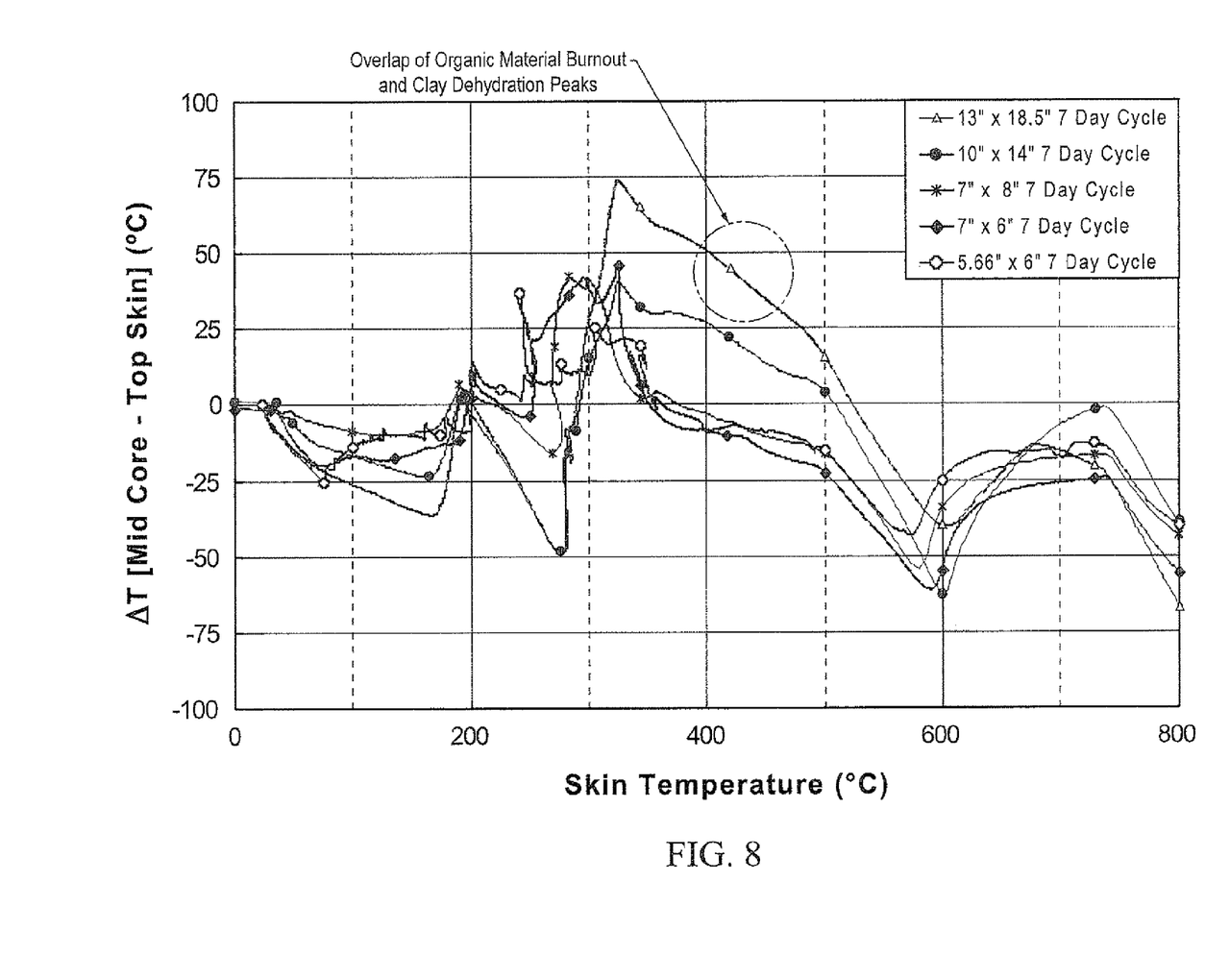
FIG. 8 is a graph illustrating core/skin temperature differential ($\Delta T$) as a function of skin temperature for various light-duty and heavy-duty diesel filters.

As illustrated in FIG. 8, the present teachings may be applied to various filter sizes, including, for example, cordierite heavy-duty diesel (HDD) filters. In FIG. 8, core/skin temperature differential (ΔT) was plotted as a function of skin temperature for a 7-Day firing cycle for various LDD and HDD filter sizes, the results demonstrating the sensitivity of ΔT values, and therefore cracking, to size. As shown in FIG. 8, a structure's size may affect internal cracking in a similar manner to that exhibited by shortening the timed temperature cycle during a first stage of the initial firing regime (i.e., increasing the temperature too quickly in the first stage). Accordingly, similar to the LDD filters described above, the positive ΔT values, exceeding about 30° C., during the second stage of the initial firing regime were identified for the largest structure (i.e., the 13"×18.5" HDD filter), in the range of about 400° C. to about 525° C. as depicted in FIG. 8, as corresponding to internal cracking. The ramp rates employed during the first stage of the initial firing regime were then sufficiently slowed to resolve the overlap problem, thereby, reducing crack levels significantly in a 13"×15" HDD filter with a new 8-Day firing cycle.

Figure 9:
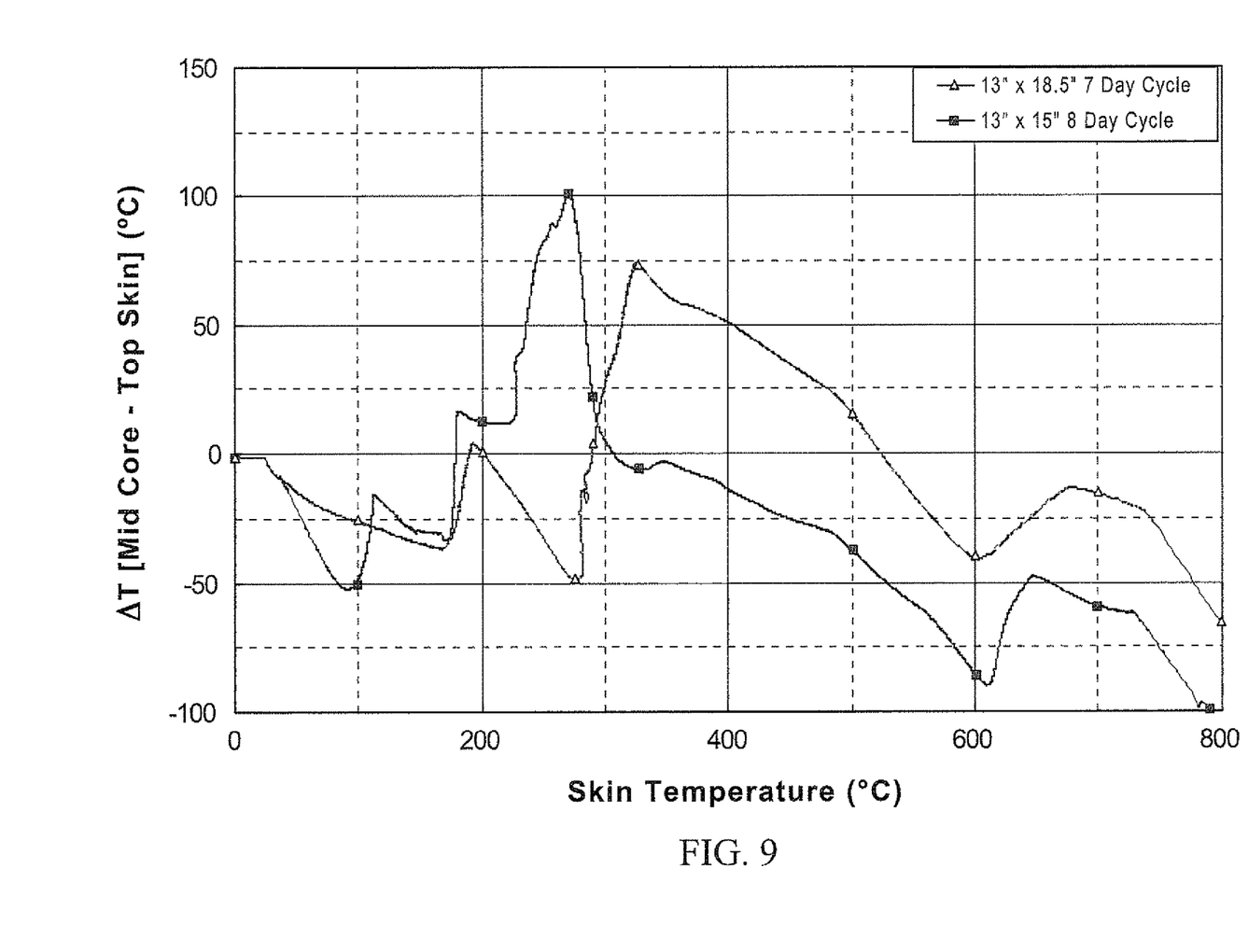
FIG. 9 is a graph illustrating core/skin temperature differential ($\Delta T$) as a function of skin temperature for experimental firing cycles for heavy-duty diesel filters.

In FIG. 9, core/skin temperature differential (ΔT) was plotted as a function of skin temperature for both the 7-Day firing cycle and the new 8-Day firing cycle for two roughly similarly sized HDD filters (13"×18.5" and 13"×15", respectively). As shown in FIG. 9, in comparison to the 7-Day cycle, the 8-Day cycle showed negative ΔT values during the second stage of the initial firing regime corresponding to the temperature range from about 400° C. to about 600° C., thereby demonstrating that the burnout of organic material was completed prior to initiation of clay dehydration proximate the core of the ceramic structure.

Figure 10:
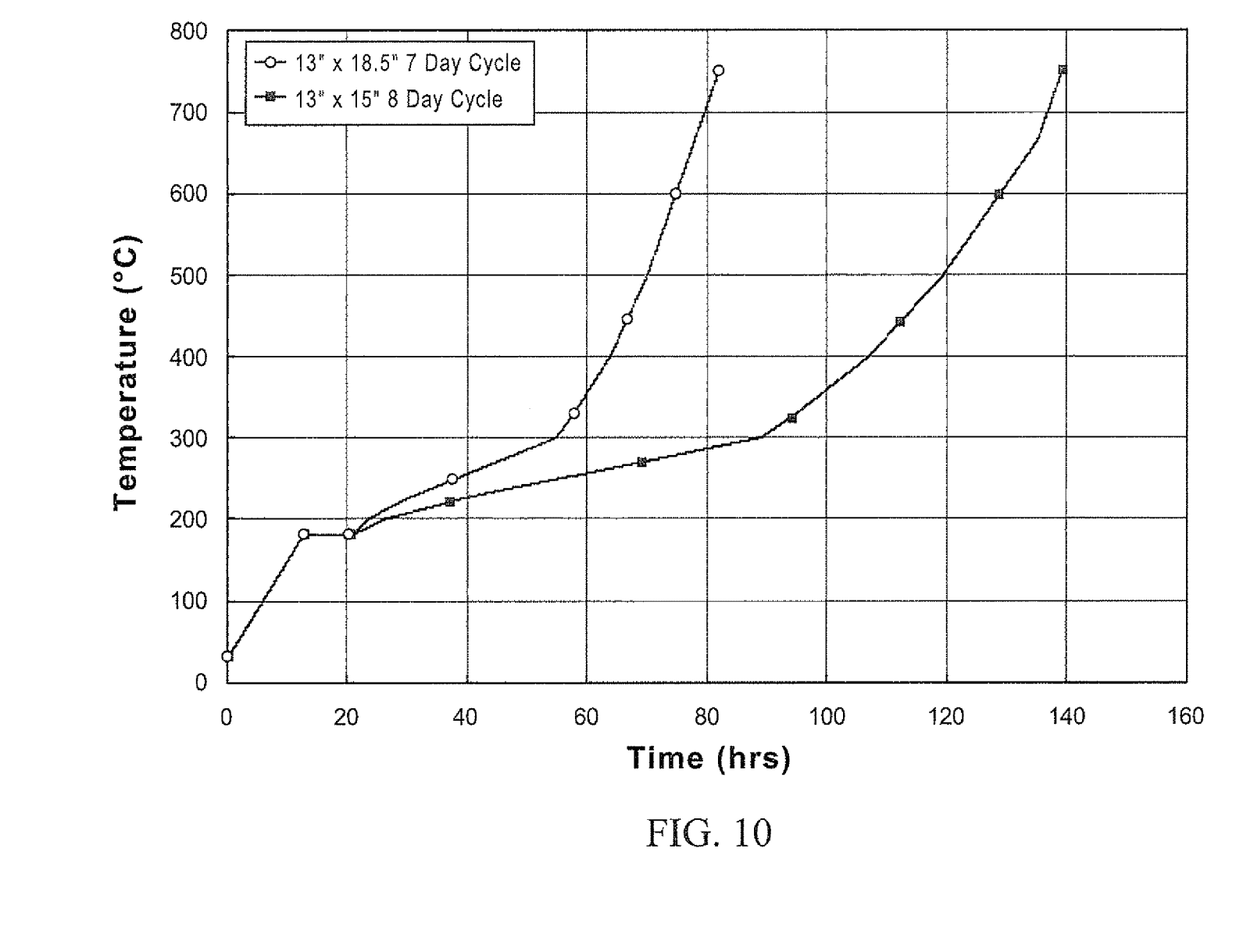
FIG. 10 is a graph illustrating the first and second stages of the initial regime for the firing cycles of FIG. 9.

FIG. 10 illustrates the first and the second stages of the initial firing regime for the firing cycles of FIG. 9. As shown in FIGS. 9 and 10, the 8-Day cycle demonstrated crack prevention for an HDD filter on a minimized firing cycle length of time, wherein heating the firing environment during the first stage included heating the firing environment at an average ramp rate of about 2.3° C./hr. And heating the firing environment during the second stage included heating the firing environment at an average ramp rate of about 11° C./hr. Consequently, the 8-Day cycle demonstrates prevention of internal cracking for HDD filters, wherein heating the firing environment during the first stage comprises heating the firing environment at an average ramp rate of less than or equal to about 2.3° C./hr (i.e., a timed temperature cycle encompassing any number of rates and holds utilized in the temperature range of from about 180° C. to about 425° C. yielding an average ramp rate of less than or equal to about 2.3° C./hr). And heating the firing environment during the second stage comprises heating the firing environment at an average ramp rate of less than or equal to about 11° C./hr, for example, an average ramp rate ranging from about 2.3° C./hr to about 11° C./hr, (i.e., a timed temperature cycle encompassing any number of rates utilized in the temperature range of from about 425° C. to about 750° C. yielding an average ramp rate of less than or equal to about 11° C./hr).

Exemplary embodiments of the present teachings thus provide methods of firing a green structure to produce a ceramic structure that minimize the firing cycle time for the ceramic structure, while also reducing and/or preventing cracking. For example, various exemplary embodiments of the present teachings may avoid overlap of the occurrence of organic material burnout and clay dehydration stages proximate a core of the structure by spending a predetermined minimum time period below and/or at a threshold temperature to allow for organic-burnout. Various exemplary embodiments may accomplish this by heating a firing environment at a first timed temperature cycle, e.g., having a relatively slow average ramp rate, during a first stage of firing to substantially complete organic material burnout prior to initiation of clay dehydration proximate a core of the structure, and then ramping up by heating the firing environment at a second timed temperature cycle, e.g., having an average ramp rate that is faster than the average ramp rate of the first timed temperature cycle, during a second stage of firing (e.g., to minimize the overall firing cycle length by shortening the initial firing regime length of time).

In various exemplary embodiments, including, for example, for cordierite light-duty diesel filters as exemplified above, heating the firing environment during the first stage of the initial firing regime (i.e., the BO stage) may comprise heating the firing environment at an average ramp rate of less than or equal to about 12° C./hr over a temperature ranging from about 180° C. to about 425° C. And heating the firing environment during the second stage of the initial firing regime (i.e., the clay dehydration stage) may comprise heating the firing environment at an average ramp rate of less than or equal to about 75° C./hr over a temperature ranging from about 425° C. to about 750° C.

In various additional exemplary embodiments, including, for example, for cordierite heavy-duty diesel filters as exemplified above, heating the firing environment during the first stage of the initial firing regime (i.e., the BO stage) may comprise heating the firing environment at an average ramp rate of less than or equal to about 2.3° C./hr over a temperature ranging from about 180° C. to about 425° C. And heating the firing environment during the second stage of the initial firing regime (i.e., the clay dehydration stage) may comprise heating the firing environment at an average ramp rate of less than or equal to about 11° C./hr over a temperature ranging from about 425° C. to about 750° C.

As exemplified above, various exemplary embodiments of the present teachings thus provide cordierite light-duty diesel and heavy-duty diesel filters, wherein heating the firing environment during the first stage of the initial firing regime (i.e., the BO stage) may comprise heating the firing environment at an average ramp rate of less than or equal to about 12° C./hr over a temperature ranging from about 180° C. to about 425° C. And heating the firing environment during the second stage of the initial firing regime (i.e., the clay dehydration stage) may comprise heating the firing environment at an average ramp rate ranging from about 11° C./hr to about 75° C./hr over a temperature ranging from about 425° C. to about 750° C.

Various additional exemplary embodiments may accomplish substantially preventing the overlap of the BO stage and the clay dehydration stage proximate a core of a green structure during firing by heating a firing environment relatively quickly (e.g., at a relatively high ramp rate) during the first stage of the initial firing regime up to a threshold temperature for at least a first predetermined minimum time period, holding the firing environment at that threshold temperature for a second predetermined minimum time period sufficient to allow for substantial completion of organic material burnout prior to initiation of clay dehydration proximate a core of the structure, and then continuing to heat and increase the temperature of the firing environment (e.g., again at a relatively high ramp rate) during a second stage of the initial firing regime. For various exemplary embodiments, for example for a cordierite light-duty diesel filter, the threshold temperature can range from about 400° C. to about 425° C. Also, for various exemplary embodiments, for example for a cordierite light-duty diesel filter, the first and second predetermined minimum time periods together can range from about 24 hours to about 46 hours.

Various additional exemplary embodiments may further accomplish substantially preventing the overlap of the BO stage and the clay dehydration stage proximate a core of a green structure during firing by heating the firing environment during a first stage of the initial firing regime at a timed temperature cycle that affords a predetermined minimum time period below the threshold temperature, to allow for substantial completion of organic material burnout prior to initiation of clay dehydration, and then continues to heat and increase the temperature of the firing environment during a second stage of the initial firing regime. For various exemplary embodiments, for example for a cordierite light-duty diesel filter, the threshold temperature can range from about 400° C. to about 425° C. Also, for various exemplary embodiments, for example for a cordierite light-duty diesel filter, the first and second predetermined minimum time periods together can range from about 24 hours to about 46 hours.

In various exemplary embodiments wherein the first and second predetermined time periods described above together range from about 24 hours to about 46 hours, the time from initiation of firing to completion of the second stage of the initial firing regime may range from about 39 hours to about 62 hours.

Other characteristics of the ceramic structures, and methods of making the same, in accordance with the present teachings may also be altered as desired, including, for example, the materials used for the structures and the structural configuration (e.g., dimensions, shapes, etc.). Ordinarily skilled artisans would understand that ceramic structures in accordance with the present teachings may include any number of clay-based structures, including, for example, clay-based particulate filters and/or other porous ceramic structures, without departing from the scope of the present teachings. Utilizing the present teachings, as described above with regard to cordierite light-duty and heavy-duty diesel filters, if core/skin temperature differential ($\Delta T$) is plotted as a function of skin temperature, once the positive $\Delta T$ values during a second stage of the initial firing regime (i.e., during the clay dehydration stage) are identified for the structure, the average ramp rate of the timed temperature cycle used during a first stage of the initial firing regime (i.e., during the BO stage) can be slowed until the positive $\Delta T$ values are less than or equal to about 30° C., thereby, indicating that the organic material burnout and clay dehydration stages occurring proximate the core no longer overlap.

Various exemplary embodiments of the present teachings further contemplate methods of firing a green structure to produce a ceramic structure, which methods employ various gases and firing additives, such as, for example, nitrogen, in conjunction with the above teachings. Nitrogen, for example, may delay the organic material burnout exothermic reaction until after the clay dehydration endothermic event, therefore, also avoiding overlap of the organic-burnout and clay dehydration stages to reduce or prevent cracking. Those ordinarily skilled in the art would understand how to utilize the present teachings in combination with various additional conventional firing methods to further minimize the overall firing cycle time, while reducing and/or eliminating internal cracking.

Furthermore, although various exemplary embodiments of the present teachings refer to producing ceramic structures, such as, for example, cordierite light-duty and heavy-duty diesel filters, the present teachings encompass a wide range of ceramic structures useful in various applications and for filtering various types of particulate matters. Exemplary applications include, but are not limited to, for example, filters for use in coal combustion power plants, gasoline engines, industrial liquid filtration systems, catalyst substrate applications, and for stationary and non-stationary applications.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It should be understood that while the invention has been described in detail with respect to various exemplary embodiments thereof, it should not be considered limited to such, as numerous modifications are possible without departing from the broad scope of the appended claims.

I claim:

1. A method of firing a green structure to produce a ceramic structure, the method comprising:

heating a firing environment during a first stage of firing of a green structure over a first timed temperature cycle having an average ramp rate sufficient to substantially complete burnout of organic material prior to initiation of clay dehydration proximate a core of the ceramic structure, wherein heating the firing environment during the first stage of firing comprises heating the firing environment from about 180° C. to about 425° C. at an average ramp rate of less than or equal to about 12° C./hr, and wherein heating the firing environment during the first stage comprises heating the firing environment up to a threshold temperature for at least a first predetermined minimum time period and holding the firing environment at the threshold temperature for a second predetermined time period, wherein the first and second predetermined time periods together range from about 24-46 hours; and heating the firing environment during a second stage of the firing over a second timed temperature cycle having an average ramp rate that is faster than the average ramp rate of the first timed temperature cycle, wherein heating the firing environment during the second stage of firing comprises heating the firing environment from about 425° C. to about 750° C.; and wherein the time from initiation of the first stage to completion of the second stage is less than or equal to about 62 hours.

2. The method of claim 1, wherein heating the firing environment during the first stage comprises heating the firing environment from a temperature of about 180° C. to a temperature of about 350° C. at an average ramp rate of less than or equal to about 25° C./hr.

3. The method of claim 1, wherein heating the firing environment during the second stage comprises heating the firing environment over a second timed temperature cycle having an average ramp rate of less than or equal to about 75° C./hr.

4. The method of claim 1, wherein a maximum difference in temperatures taken at a location proximate a core of the green structure and at a location proximate a top, skin portion of the green structure is less than or equal to about 30° C. during the second stage of the firing.

5. The method of claim 1, wherein a maximum difference in temperatures taken at a location proximate a core of the green structure and at a location proximate a top, skin portion of the green structure is less than or equal to about 0° C. during the second stage of the firing.

6. The method of claim 1, wherein the threshold temperature ranges from about 400° C. to about 425° C.

7. A porous ceramic structure made by a process comprising:

forming raw materials comprising clay material and organic material into a green structure; and firing the green structure in a firing environment, wherein the firing comprises heating a firing environment during a first stage up to and including a first threshold temperature over a first predetermined time period sufficient to substantially complete burnout of the organic material prior to initiation of dehydration of the clay material proximate a core of the green structure, and holding the firing environment at the first threshold temperature for a second predetermined time period, wherein the first and second predetermined time periods together range from about 24-46 hours;

wherein the first stage comprises heating the firing environment from about 180° C. to about 425° C. at an average ramp rate of less than or equal to about 12° C./hr; and heating the firing environment during a second stage from the first threshold temperature to a second threshold temperature of about 750° C. over a third time period during which clay dehydration occurs, wherein the time from initiation of the first stage to completion of the second stage is less than or equal to about 62 hours; and wherein an average ramp rate from the first threshold temperature to the second threshold temperature ranges up to about 75° C./hr.

8. The ceramic structure of claim 7, wherein the organic material comprises a binder and a starch.

9. The ceramic structure of claim 7, wherein the ceramic structure comprises a particulate filter.

10. The ceramic structure of claim 9, wherein the ceramic structure comprises one of a light-duty and a heavy-duty diesel particulate filter.

11. The ceramic structure of claim 1, wherein the first threshold temperature ranges from about 400° C. to about 425° C.

12. A method of firing a green structure to form a ceramic structure, the method comprising:

heating a firing environment during a first stage to a first threshold temperature over a first predetermined time period sufficient to substantially complete burnout of organic material proximate a core of a green structure prior to initiation of dehydration of clay material proximate the core region of the green structure, and holding the firing environment at the first threshold temperature for a second predetermined time period, wherein the first and second predetermined time periods together range from about 24-46 hours, wherein heating the firing environment during the first stage of firing comprises heating the firing environment from about 180° C. to about 425° C. at an average ramp rate of less than or equal to about 12° C./hr; and heating the firing environment during a second stage from the first threshold temperature to a second threshold temperature higher than the first threshold temperature over a third time period during which clay dehydration of the green structure occurs, wherein an average ramp rate from the first threshold temperature to the second threshold temperature ranges up to about 75° C./hr, and wherein heating the firing environment during the second stage of firing comprises heating the firing environment from about 425° C. to about 750° C.; and wherein the time from initiation of the first stage to completion of the second stage is less than or equal to about 62 hours.

* * * * *